(12) United States Patent
Morikawa et al.

(10) Patent No.: US 6,578,352 B2
(45) Date of Patent: Jun. 17, 2003

(54) COMBINED CYCLE POWER PLANT

(75) Inventors: Aki Morikawa, Chiba-ken (JP); Yoichi Sugimori, Kanagawa-ken (JP); Haruo Oikawa, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 40 days.

(21) Appl. No.: 09/871,871

(22) Filed: Jun. 4, 2001

(65) Prior Publication Data

US 2001/0047652 A1 Dec. 6, 2001

(30) Foreign Application Priority Data

Jun. 6, 2000 (JP) ........................................ 2000-169292

(51) Int. Cl.[7] .............................................. F02C 6/18
(52) U.S. Cl. ...................................... 60/39.182; 60/806
(58) Field of Search ............................... 60/39.182, 806

(56) References Cited

U.S. PATENT DOCUMENTS 5,577,377 A * 11/1996 Tomlinson ................ 60/39.182

FOREIGN PATENT DOCUMENTS

JP 11-62515 3/1999

\* cited by examiner

Primary Examiner—Louis J. Casaregola
(74) Attorney, Agent, or Firm—Oblon, Spivak, McClelland, Maier & Neustadt, P.C.

(57) ABSTRACT

A combined cycle power plant including a gas turbine plant, a heat recovery steam generator, and a steam turbine plant. The heat recovery steam generator includes a main stream side steam piping, a bypass side steam piping, a steam branching to branch a steam flowing from a former stage in the heat recovery steam generator into two steams, one as a main stream side steam and another as a de-superheating steam, and a steam merging portion to merge the main stream side steam superheated by the high pressure superheater and the de-superheating steam passed through the bypass side steam piping. The heat recovery steam generator is provided with a blocking prevention function to prevent blocking of the main stream side steam piping and the bypass side steam piping and a thermal stress generation protection function.

13 Claims, 10 Drawing Sheets

COMBINED CYCLE POWER PLANT

BACKGROUND OF THE INVENTION

1. Field of the Invention

The present invention relates to a combined cycle power plant, and more particularly to a combined cycle power plant composed of a gas turbine system, a steam turbine system and a heat recovery steam generator.

2. Description of the Related Art

For recent combined cycle power plants, the development for the higher output and the higher heat efficiency is progressed, and the problem with respect to the combined cycle power plants when the combustion gas temperature at the inlet of a gas turbine is raised to 1500° C. class from 1300° C. class is under the verification.

When the combustion gas temperature at the gas turbine inlet is raised up to 1500° C. class, it is not possible to sufficiently cool down rotor blades and stator blades which are gas turbine high temperature portions by a so-called air cooling system to cool the high temperature portions by the compressed air extracted from an air compressor.

So, it has become to select steam that has larger specific heat than air and is suited for the heat absorption as a new cooling medium.

On the other hand, as the steam fed to the steam turbine from the heat recovery steam generator rises to a high temperature with the increase in the combustion gas temperature of the gas turbine plant, it becomes necessary to control the temperature of the high pressure steam outputted from the heat recovery steam generator to a more proper temperature than before. If the temperature of the high pressure steam outputted from the heat recovery steam generator becomes abnormally high, it exceeds a maximum allowable temperature of the steam turbine plant, and the excessive thermal stress is generated. As a result, it becomes difficult to maintain the material strength of its piping and equipments (various valves, steam turbines, etc.) and they can be deformed and damaged.

Furthermore, if the temperature of the steam to cool down the high temperature portions of the gas turbine is too high, the high temperature portions of the gas turbine cannot be sufficiently cooled, and it exceeds critical temperatures of the materials composing the gas turbine. As a result, such serious troubles of the gas turbine as deformation, damage, etc. may be caused.

Therefore, in the prior art disclosed in the Japanese Patent Disclosure (Kokai) No. Hei 9-112292, a combined cycle power plant is examined with the construction as described below. That is, in the combined cycle power plant, after the saturated steam outputted from a high pressure drum is superheated by a first high pressure superheater to become a superheated steam, this superheated steam is branched into two steams at the outside of a casing of a heat recovery steam generator. One of them (for convenience, this steam is called as a main stream side steam) is introduced into a second high pressure superheater via a first control valve, and its steam temperature is further raised by the gas turbine exhaust gas. The other steam (for convenience, this steam is called as a de-superheating steam) flows through a de-superheating steam bypass side steam piping installed at the outside of the casing of the heat recovery steam generator via a second control valve so as to bypass the second high pressure superheater. And then, the two steams in different temperatures are merged immediately before introduced into a high pressure steam turbine so that a temperature of the high pressure steam that is introduced into the high pressure steam turbine does not rise excessively.

However, according to the prior art disclosed in the Japanese Patent Disclosure (Kokai) No. Hei 9-112292, two problems shown below have not yet been solved.

(1) Blocking Protection Measure for Control Valves

In the prior art, no safety measure for the blocking protection is provided in the first and second control valves. If two control valves have no safety measure for blocking protection, the control valves may possibly be blocked by erroneous operation. If at least one of the control valves is blocked, the heat recovery steam generator may be damaged by the abnormal pressure rise, the tubes provided at the downstream of the control valves may be damaged as a result of burning without the steam, or the gas turbine may be damaged due to the insufficient cooling steam.

(2) Thermal Stress Protection Measure for Steam Merging Portion

Depending on the operating state of the plant, a large difference may be generated between the temperature of the main stream side steam after passing the superheater and that of the de-superheating steam. In this case, a large thermal stress may possibly be generated at the steam merging portion. If a large thermal stress is generated at this steam merging portion, the damage of the piping may result.

SUMMARY OF THE INVENTION

Accordingly, one object of the present invention is to provide a combined cycle power plant using steam as a de-superheating medium of superheated steam which can protect a heat recovery steam generator and a gas turbine from being broken and the piping from being damaged.

These and other objects of this invention can be achieved by providing a combined cycle power plant including a gas turbine plant with a gas turbine provided with a high temperature cooled portion, a heat recovery steam generator to generate steam by recovering thermal energy of exhaust gas from the gas turbine plant, a steam turbine plant driven by the steam generated from the heat recovery steam generator, and a cooling steam system to flow the steam from the heat recovery steam generator to the high temperature cooled portion of the gas turbine for cooling. The heat recovery steam generator includes a main stream side steam piping, a bypass side steam piping, a steam branching portion connected to the main stream side steam piping and the bypass side steam piping to branch a steam flowing from a former stage in the heat recovery steam generator into two steams, one as a main stream side steam flowing through the main stream side steam piping and another as a de-superheating steam flowing through the bypass side steam piping, a high pressure superheater connected to the main stream side steam piping for superheating the main stream side steam, and a steam merging portion to merge the main stream side steam superheated by the high pressure superheater and the de-superheating steam passed through the bypass side steam piping. The steam merged in the steam merging portion is supplied to a next stage in the heat recovery steam generator, and the heat recovery steam generator is provided with a blocking prevention function to prevent blocking of the main stream side steam piping and the bypass side steam piping and a thermal stress generation protection function.

According to one aspect of this invention, there is provided a combined cycle power plant including a gas turbine plant with a gas turbine provided with a high temperature cooled portion, a heat recovery steam generator to generate steam by recovering thermal energy of exhaust gas from the gas turbine plant, a steam turbine plant driven by the steam generated from the heat recovery steam generator, and a cooling steam system to flow the steam from the heat recovery steam generator to the high temperature cooled portion of the gas turbine for cooling. The heat recovery steam generator includes a main stream side steam piping, a bypass side steam piping, a steam branching portion connected to the main stream side steam piping and the bypass side steam piping to branch a steam flowing from a former stage in the heat recovery steam generator into two steams, one as a main stream side steam flowing through the main stream side steam piping and another as a de-superheating steam flowing through the bypass side steam piping, a high pressure superheater connected to the main stream side steam piping for superheating the main stream side steam, and a steam merging portion to merge the main stream side steam superheated by the high pressure superheater and the de-superheating steam passed through the bypass side steam piping. The steam merged in the steam merging portion is supplied to a next stage in the heat recovery steam generator. The steam merging portion includes a three way valve provided with a first inlet piping, a second inlet piping and an outlet piping. The first inlet piping is connected to the main stream side piping at an outlet of the high pressure superheater for taking in the main stream side steam, and the second inlet piping is connected to the bypass side steam piping for taking in the de-superheating steam. The three way valve merges the main stream side steam superheated by the high pressure superheater and the de-superheating steam passed through the bypass side steam piping, and the steam merged in the three way valve is supplied from the outlet piping to the next stage in the heat recovery steam generator. The heat recovery steam generator is provided with a blocking prevention function to prevent blocking of the main stream side steam piping and the bypass side steam piping.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
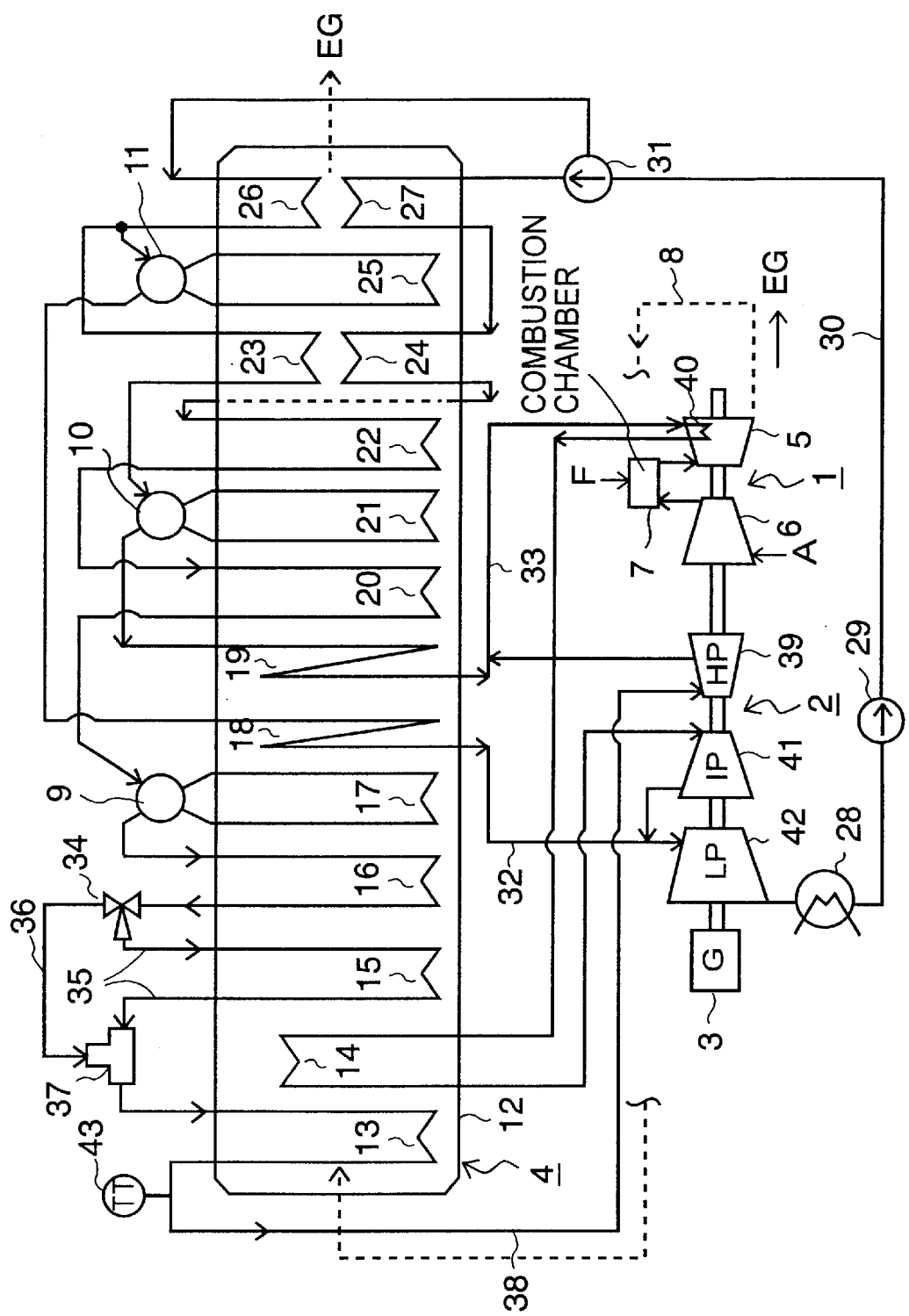
FIG. 1 is a schematic system diagram of a combined cycle power plant according to a first embodiment of the present invention.

Referring now to the drawings, wherein like reference numerals designate identical or corresponding parts throughout the several views, the embodiments of this invention will be described below.

FIG. 1 is a schematic system diagram showing a combined cycle power plant according to a first embodiment of the present invention. Shown here is an example of a combined cycle power plant composed of a gas turbine plant 1, a steam turbine plant 2 and a generator 3 combined in one shaft. Heat energy contained in exhaust gas outputted from a gas turbine 5 is recovered by a heat recovery steam generator 4 and the steam generated in heat recovery steam generator 4 is fed to steam turbine plant 2.

Gas turbine plant 1 has a gas turbine 5 and an air compressor 6 mounted to one shaft. High temperature and high pressure discharged air compressed by air compressor 6 is sent to a combustion chamber 7, wherein it is mixed with a fuel F and is burned. High temperature combustion gas produced by burning fuel F is guided to gas turbine 5, wherein it is expanded and drives gas turbine 5 thereby to generate power by generator 3. Expanded combustion gas is exhausted through gas turbine 5 as an exhaust gas EG, and after passing an exhaust duct 8, exhaust gas EG is guided to heat recovery steam generator 4. Here, exhaust gas EG heats feed water fed from steam turbine plant 2 and after producing the steam in heat recovery steam generator 4, it is exhausted to the outside through a chimney via a flue (not shown).

Heat recovery steam generator 4 adopts, as an example, a 3-pressure system of high, intermediate and low pressures. A high pressure drum 9, an intermediate pressure drum 10 and a low pressure drum 11 are installed for one of the three pressure portions, respectively.

In a casing 12 of heat recovery steam generator 4, a third high pressure superheater 13, a reheater 14, a second high pressure superheater 15, first high pressure superheater 16, a high pressure evaporator 17 connected to high pressure drum 9, a low pressure superheater 18, an intermediate pressure superheater 19, a fourth high pressure economizer 20, an intermediate pressure evaporator 21 connected to intermediate pressure drum 10, a third high pressure economizer 22, a second intermediate pressure economizer 23, a second high pressure economizer 24, a low pressure evaporator 25 connected to low pressure drum 11, an intermediate/ low pressure economizer 26 and a first high pressure economizer 27 are sequentially arranged in the direction of exhaust gas EG to flow down from the upper stream side to the downstream side. In these heat exchangers in heat recovery steam generator 4, exhaust gas EG exchanges heat with the steam or the feed water.

Further, second intermediate pressure economizer 23 and second high pressure economizer 24, and intermediate/low pressure economizer 26 and first high pressure economizer 27 are installed in parallel with each other in the flow down direction of exhaust gas EG as illustrated, respectively.

To heat recover steam generator 4 constructed as described above, water is fed as shown below.

Condensed water flowing out of a condenser 28 is boosted by a condensate pump 29 and is fed to a feed water pump 31 through a piping 30. Feed water pump 31 boosts the feed water, and feeds the boosted water to intermediate/low pressure economizer 26 by extracting one part of it from a discharging port at the middle stage thereof, and on the other hand, feeds the remaining boosted water to first high pressure economizer 27 from a discharge port at the final stage thereof.

The feed water heated by intermediate/low pressure economizer 26 is fed to low pressure drum 11, and also fed to intermediate pressure drum 10 via second intermediate pressure economizer 23. Further, the saturated steam produced in low pressure drum 11 is led to low pressure superheater 18, and after superheated there, it is outputted to a low pressure steam feed system 32. The saturated steam in intermediate pressure drum 10 is led to intermediate pressure superheater 19 and is superheated there, and then, it is outputted to a cooling steam system 33.

On the other hand, the feed water heated in first high pressure economizer 27 is heated again in second high pressure economizer 24, and then, it is further heated in third high pressure economizer 22, and after further heated in fourth high pressure economizer 20, it is fed to high pressure drum 9. Saturated steam flowing out of high pressure drum 9 is superheated in first high pressure superheater 16.

At the outlet side of first high pressure superheater 16, there is provided a steam branching portion 34 to distribute (branch) the superheated steam into two steams; a main stream side steam and a de-superheating steam. Further, a three way valve is adopted as a steam branching portion 34 in this embodiment.

Three way valve 34 is controlled its valve openings by a controller 50 shown in FIG. 4 that is described later. Three way valve 34 distributes the superheated steam fed from first high pressure superheater 16 by branching it into two parts; the main stream side steam and the de-superheating steam, and sends out them to a main stream side steam piping 35 and a bypass side steam piping 36, respectively.

The main stream side steam out of these two steams is led through main stream side steam piping 35 to second high pressure superheater 15, wherein it is further superheated. The other de-superheating steam bypasses second high pressure superheater 15, and it is not heated, but its temperature rather drops a little as the heat of the de-superheating steam is discharged. The main stream side steam and the de-superheating steam at different temperatures are led to a steam merging portion 37. The main stream side steam is de-superheated as it is mixed with de-superheating steam of a lower temperature in steam merging portion 37, and the merged steam is sent to third high pressure superheater 13. An example of steam merging portion 37 will be described later in FIG. 3.

When the amount of the de-superheating steam flowing through the bypass side steam piping 36 is increased, the temperature of the merged steam outputted from steam merging portion 37 is lowered proportionally. Therefore, the temperature of the merged steam sent to third high pressure superheater 13 can be controlled by controlling the opening of the bypass side steam piping side valve of three way valve 34.

Third high pressure superheater 13 further superheats the inputted superheated steam. However, as the inputted steam temperature is already de-superheated at the input side thereof so that it does not becomes excessively high, the temperature of the superheated steam, that is, the high pressure steam outputted from heat recovery steam generator 4 is controlled to below a preset temperature so that it does not become excessively high.

This high pressure steam is fed to a high pressure steam turbine 39 via a high pressure steam feed system 38. The exhaust from high pressure steam turbine 39 is merged with the intermediate pressure steam in cooling steam system 33, and then, is led to a high temperature cooled portion (turbine high temperature portion) 40 of gas turbine 5. The steam of which temperature is raised after cooling high temperature cooled portion 40 is fed to reheater 14, and after reheated there, is fed to an intermediate pressure steam turbine 41. The exhaust from intermediate pressure steam turbine 41 is merged with the low pressure steam in low pressure steam feed system 32 and is fed to a low pressure steam turbine 42.

Thus, high pressure steam turbine 39, intermediate pressure steam turbine 41 and low pressure steam turbine 42 obtain rotary driving forces by the expansion of the steams supplied to respective turbines, and generate power by driving generator 3 jointly with gas turbine 5.

Figure 4:
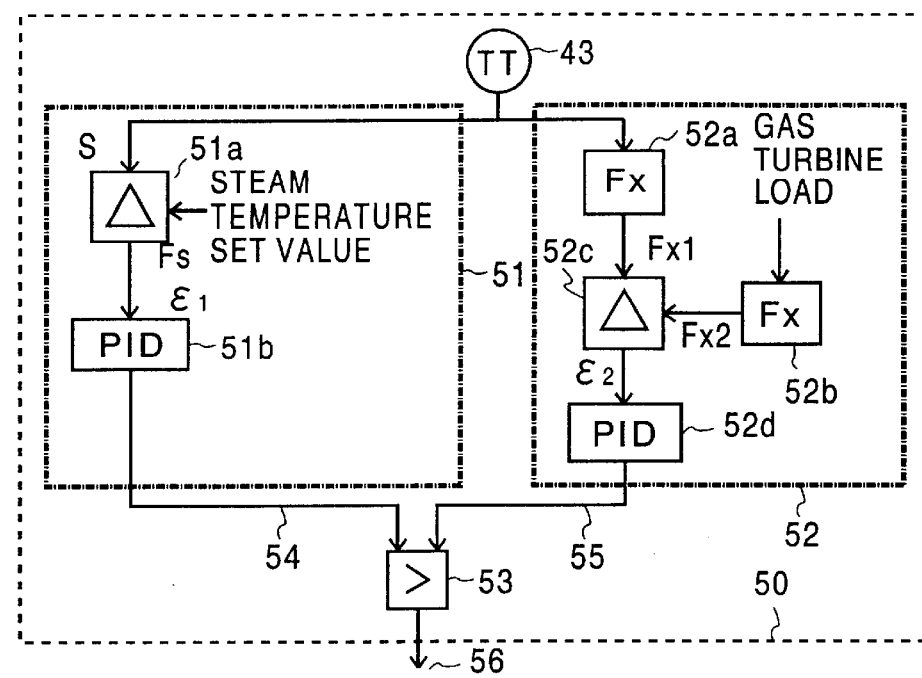
FIG. 4 is a diagram showing one example of a controller used in the first embodiment of the present invention shown in FIG. 2.

Further, 43 is a steam temperature measuring instrument to measure a temperature of the steam outputted from third high pressure superheater 13, and its measured value is input to a controller 50 shown in FIG. 4.

Next, the opening control of three way valve 34 will be described referring to FIG. 2.

Figure 2:
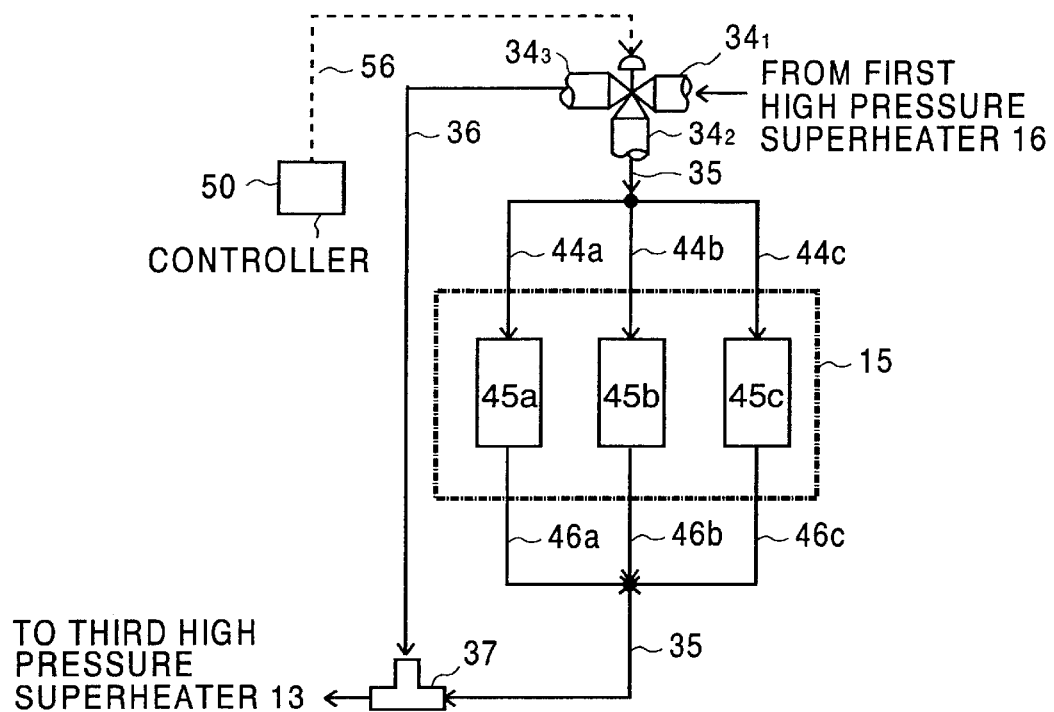
FIG. 2 is a diagram showing the main part of the first embodiment of the present invention shown in FIG. 1.

FIG. 2 is a block diagram showing an example of the main part of the combined cycle power plant according to the first embodiment of the present invention.

$34_1$ is an inlet piping connected to the outlet of first high pressure superheater 16, $34_2$ is an outlet piping connected to main stream side steam piping 35 through which the main stream side steam flows, and $34_3$ is an outlet piping connected to bypass side steam piping 36.

Three way valve 34 is not blocked because of its own structure, and the opening of main stream side steam piping 35 or bypass side steam piping 36 is controlled according to a control signal given from controller 50 that is described later. Main stream side steam piping 35 is branched into three inlet connecting pipings 44a, 44b, 44c, which are respectively connected to the inlets of heating panels 45a, 45b, 45c, each of which is composed of a fin tube. Here, heating panels 45a, 45b, 45c composes second high pressure superheater 15. The outlets of heating panels 45a, 45b, 45c are joined into one at the outlet of main stream side steam piping 35 via respective outlet connecting pipings 46a, 46b, 46c, and is then connected to a main stream side steam piping inlet of steam merging portion 37.

On the other hand, bypass side steam piping 36 is connected between outlet piping $34_3$ of three way valve 34 for the de-superheating steam and a branch piping inlet of steam merging portion 37, and is installed the outside of casing 12 so that it is not exposed to exhaust gas EG.

Thus, the superheated steam from first high pressure superheater 16 is branched into two parts; the main stream side steam and the de-superheating steam by three way valve 34. The main stream side steam is led to steam merging portion 37 after further superheated by second high pressure superheater 15, and the de-superheating steam bypasses second high pressure superheater 15 and is led to steam merging portion 37.

These two steam flows are mixed in steam merging portion 37, thereby to de-superheat the outlet steam of second high pressure superheater 15.

Figure 3:
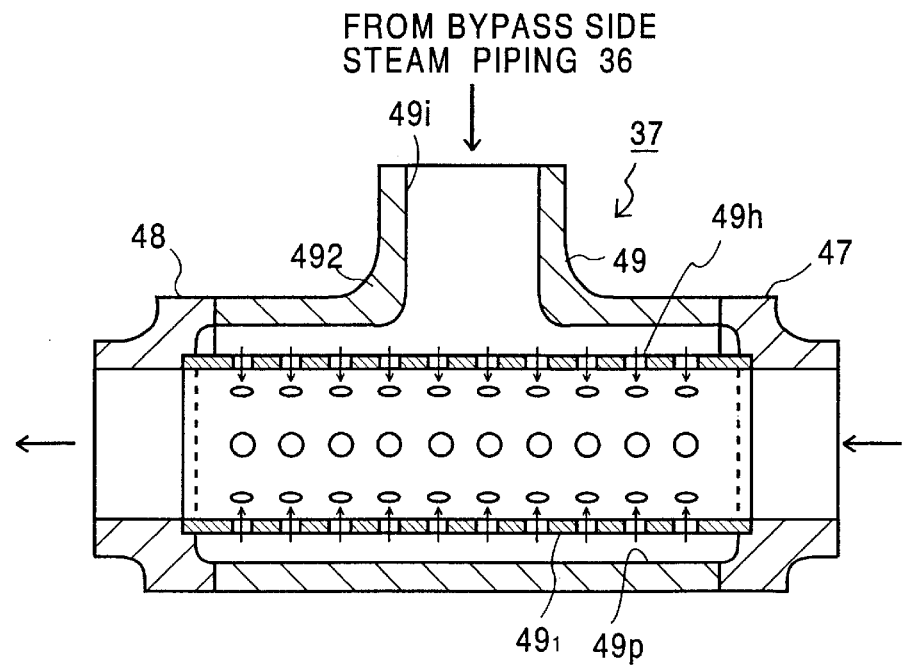
FIG. 3 is a sectional view of one example of a steam merging portion used in the first embodiment of the present invention shown in FIG. 1.

FIG. 3 is a block diagram showing one example of steam merging portion 37 in the combined cycle power plant shown in FIG. 1. Steam merging portion 37 is composed of a main stream side inlet piping 47 connected to the outlet of second high pressure superheater 15, an outlet piping 48 connected to the inlet of third high pressure superheater 13, and a T-shaped fluid coupling 49 provided with a branch piping 49$i$ for taking the de-superheating steam therein. T-shaped fluid coupling 49 connects between main stream side inlet piping 47 and outlet piping 48.

T-shaped fluid coupling 49 is in double piping structure, and its inner piping $49_1$ has an inner diameter of the same size as the inner diameters of inlet piping 47 and outlet piping 48, and furthermore, is provided with a lot of small steam blow-in holes $49_h$ on the whole outer surface. Inner piping $49_1$ is surrounded with a T-shaped outer piping $49_2$ so as to produce a clearance (a passage) $49_p$ of a prescribed size on the outer circumference of inner piping $49_1$. Further, the reason for providing passage $49_p$ of the prescribed size between inner piping $49_1$ and outer piping $49_2$ is to blow the de-superheating steam sent from bypass side steam piping 36 into the inside of inner piping $49_1$ uniformly through small holes $49_h$ on the whole outer surface.

When main stream side steam sent from second high pressure superheater 15 enters into inlet piping 47 and passes through inside of the inner piping $49_1$, it is uniformly mixed with the de-superheating steam blown off through a lot of small steam blow-in holes $49_h$, and after its temperature is lowered, it flows out of outlet piping 48.

Thus, steam merging portion 37 uniformly mixes the high temperature main stream side steam with the low temperature de-superheating steam, and therefore, when two steam flows in different temperatures are mixed, the thermal stress is not produced, or even if produced, it can be suppressed to a small value.

Next, referring to a block circuit diagram shown in FIG. 4, one example of controller 50 that controls three way valve 34 in the combined cycle power plant shown in FIG. 1 will be described.

In FIG. 4, controller 50 is composed of a control block circuit 51 that prepares a first valve opening signal 54, a control block circuit 52 that prepares a second valve opening signal 55 and a higher value preference circuit 53. Hereinafter, for convenience of the explanation, control block circuit 51 and control block circuit 52 are referred to as a first valve opening signal preparing means and a second valve opening signal preparing means, respectively.

First valve opening signal preparing means 51 is a portion to prepare a first valve opening signal 54 to control the outlet steam temperature of heat recovery steam generator 4 for the purpose of preventing the damage of the piping and the equipments. On the other hand, second valve opening signal preparing means 52 is a portion to prepare second valve opening signal 55 to control the outlet steam temperature of heat recovery steam generator 4 for the purpose of securing the cooling capacity of high temperature cooled portion 40 for preventing the damage of gas turbine 5. To satisfy these two purposes, a larger one of first and second valve opening signals 54 and 55 respectively outputted from first and second valve opening signal preparing means 51 and 52 is selected by higher value preference circuit 53, and is outputted as a three way valve opening signal 56. Here, when three way valve opening signal 56 becomes large, the de-superheating steam flowing to bypass side steam piping 36 of three way valve 34 increases, and when valve opening signal 56 becomes small, the de-superheating steam flowing to bypass side steam piping 36 decreases.

First valve opening signal preparing means 51 acts so that a steam temperature measured value s of the steam outputted from third high pressure superheater 13 detected by steam temperature measuring instrument 43 does not exceed a steam temperature set value Fs determined for the purpose of preventing the damage of the piping and the equipments. That is, in first valve opening signal preparing means 51, a deviation computing unit 51$a$ computes a deviation signal $\epsilon 1$ from steam temperature measured value s and the steam temperature set value Fs, and a proportional integration/differentiation computing unit (PID) 51$b$ computes first valve opening signal 54 from deviation signal $\epsilon 1$. When the steam temperature measured value s rises, first valve opening signal preparing means 51 functions to lower the output steam temperature of steam merging portion 37 by making first valve opening signal 54 large so as to increase the de-superheating steam flowing to bypass side steam piping 36, and on the other hand, when the steam temperature measured value s drops, it functions to raise the output steam temperature of steam merging portion 37 by making first valve opening signal 54 small so as to decrease the de-superheating steam flowing to bypass side steam piping 36.

On the other hand, second valve opening signal preparing means 52 prepares a cooling steam temperature forecast value Fx1 at the inlet of gas turbine 5 from steam temperature measured value s detected by steam temperature measuring instrument 43 and a cooling steam temperature set value Fx2 at the inlet of gas turbine 5 from the size of a load of gas turbine 5, respectively, and functions so that cooling steam temperature forecast value Fx1 at the inlet of gas turbine 5 becomes below the cooling steam temperature set value Fx2 at the inlet of gas turbine 5.

That is, in second valve opening signal preparing means 52, a first function generator 52$a$ prepares cooling steam temperature forecast value Fx1 at the inlet of gas turbine 5 from steam temperature measured value s detected by steam temperature measuring instrument 43, a second function generator 52$b$ prepares cooling steam temperature set value Fx2 at the inlet of gas turbine 5 from the load value of gas turbine 5, a deviation computing unit 52$c$ computes a deviation signal $\epsilon 2$ from these forecast value Fx1 and set value Fx2, and a proportional integration/differentiation computing unit (PID) 52$d$ computes second valve opening signal 55 from deviation signal $\epsilon 2$.

When cooling steam temperature forecast value Fx1 at the inlet of gas turbine 5 rises higher than cooling steam temperature set value Fx2 at the inlet of gas turbine 5, second valve opening signal preparing means 52 functions to lower the output steam temperature of steam merging portion 37 by making second valve opening signal 55 large so as to increase the de-superheated steam flowing to bypass side steam piping 36, and on the contrary, when the steam temperature forecast value Fx1 at the inlet of gas turbine 5 drops to below cooling steam temperature set value Fx2 at the inlet of gas turbine 5, it functions to raise the output steam temperature of steam merging portion 37 by making second valve opening signal 55 small so as to reduce the de-superheated steam flowing to bypass side steam piping 36.

Further, instead of preparing cooling steam temperature forecast value Fx1 of the inlet of gas turbine 5, a directly measured value of the cooling steam temperature at the inlet of gas turbine 5 may be used. Further, although the load of gas turbine 5 is used as an input of function generator 52*b*, cooling steam temperature set value Fx2 at the inlet of gas turbine 5 may be computed using a fuel flow measured value or an opening of a fuel flow regulating valve.

Higher value preference circuit 53 selects a larger one of first and second valve opening signals 54 and 55 respectively outputted from first and second valve opening signal preparing means 51 and 52, and outputs it as three way valve opening signal 56.

According to this embodiment described above, as the steam flowing through second high pressure superheater 15 and the steam flowing through bypass side steam piping 36 are distributed by three way valve 34, a distributing ratio of these two steams is surely controllable. Accordingly, while using the steam as a de-superheating medium, it is possible to prevent the temperature rise of the high pressure steam over the wide operating range of a combined cycle power plant.

Further, as three way valve 34 is used as steam branching portion 34 in this embodiment, the steam is always flowing through anyone of outlet ports of three way valve 34, and accordingly there is no possibility for blocking the high pressure steam system. In addition, as three way valve 34 is installed at the inlet of second high pressure superheater 15 that is relatively at a low temperature, cheap materials can be used for three way valve 34. Further, as the change in the steam temperature at the inlet of second high pressure superheater 15 is small throughout the whole operating range of the combined cycle power plant, the reliability of three way valve 34 can be expected. In addition, because three way valve 34 is provided at the steam branching portion, the temperatures of the inlet and outlet of three way valve 34 become all equal, and no thermal stress is produced on three way valve 34 itself.

Further, as a double piping structure having a porous inner piping is adopted for steam merging portion 37 provided at the outlet of second high pressure superheater 15, it becomes possible to uniformly mix the two steams and to eliminate the uneven state of the steam after mixed.

Further, steam merging portion 37 uniformly mixes the high temperature main stream side steam with the low temperature de-superheating steam, and therefore, when the two steam flows in different temperatures are mixed, the thermal stress is not produced, or even if produced, it can be suppressed to a small value.

Further, a case of a heat recovery steam generator provided with three high pressure superheaters is taken as an example in the above embodiment, this invention is also applied to a case of a heat recovery steam generator in which no matter how many high pressure superheaters or heating panels are provided. Further, the location of steam branching portion 34 is not restricted at the outlet side of first high pressure superheater 16, but it may be at the outlet side of high pressure drum 9. Similarly, as for merging portion 37 of two steam flows, it may be provided at the outlet of heat recovery stem generator 4, that is, the outlet side of third high pressure superheater 13. Further, the present invention is also applicable to a multi-shaft combined cycle power plants instead of a single-shaft combined cycle power plant as shown in the embodiment.

Figure 5:
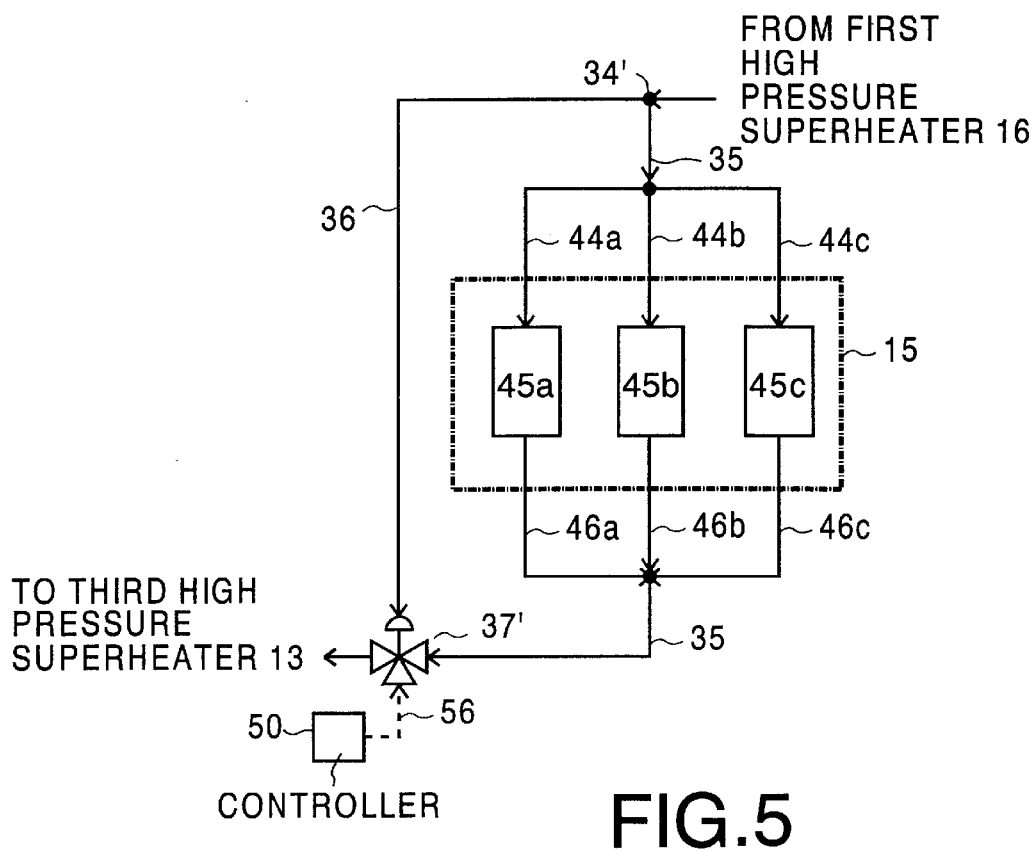
FIG. 5 is a diagram showing the main part of a combined cycle power plant according to a second embodiment of the present invention.

Next, a second embodiment of this invention will be described referring to FIG. 5. FIG. 5 is a diagram showing the main part of a combined cycle power plant according to a second embodiment of this invention, and component parts common to those shown in FIG. 2 are assigned with the same reference numerals and the detailed explanation is omitted.

34' is a branching portion of main stream side steam piping 35 and bypass side steam piping 36. Branching portion 34' corresponds to branching portion 34 in the first embodiment shown in FIG. 2, but branching portion 34' simply branches a single piping from first high pressure superheater 16 into two pipings, and is not provided with a mechanism for controlling a distribution ratio specially. The function to control the distribution ratio is given to a steam merging portion described below.

37' is a steam merging portion composed of a three way valve, which controls the amount of the main stream side steam flowing to second high pressure superheater 15 and the amount of de-superheating steam flowing to bypass side steam piping 36 by controlling a valve opening of main stream side steam piping 35 and a valve opening of bypass side steam piping 36, respectively, according to three way valve opening signal 56 from controller 50. The steam merged in three way valve 37' is introduced into third high pressure superheater 13.

According to this embodiment, as the two steams merge by three way valve 37', there is such a merit that it is not necessary to provide steam merging portion 37 for exclusive use as shown in FIG. 2. Further, other effects are omitted because they are equal to those shown in FIG. 2.

Figure 6:
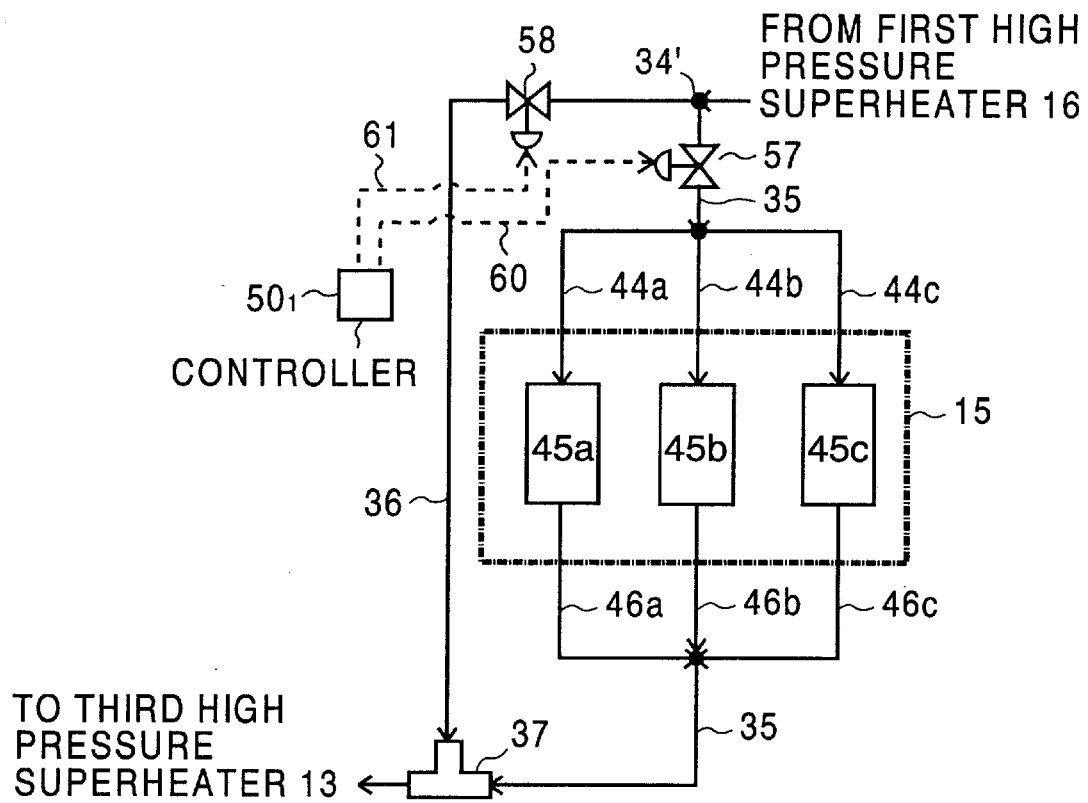
FIG. 6 is a diagram showing the main part of a combined cycle power plant according to a third embodiment of the present invention.

Next, a third embodiment of this invention will be described referring to FIG. 6. FIG. 6 is a diagram showing the main part of a combined cycle power plant according to a third embodiment of this invention, and component parts common to those shown in FIG. 2 or FIG. 5 are assigned with the same reference numerals and the detailed explanation is omitted.

FIG. 6 differs from FIG. 2 in that steam branching portion 34' simply branches a single piping from first high pressure superheater 16 into two pipings and control valves are respectively inserted in the main stream side steam piping and the de-superheating steam bypass side steam piping, instead of adopting three way valve 34 shown in FIG. 2.

In main stream side steam piping 35, a first control valve 57 is inserted at the upper stream side from the branching point of three inlet connecting pipings 44*a*, 44*b*, 44*c*. In bypass side steam piping 36 a second control valve 58 is inserted.

Figure 7:
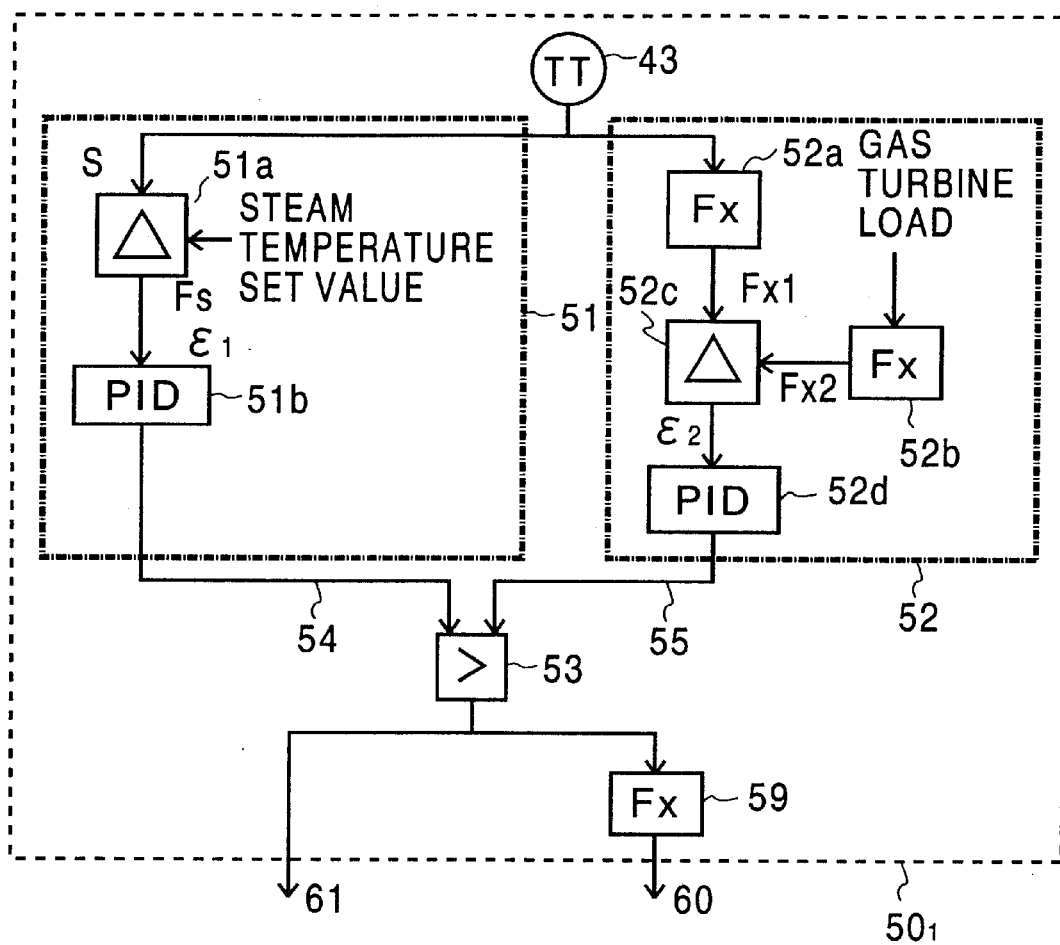
FIG. 7 is a diagram showing one example of a controller used in the third embodiment of the present invention shown in FIG. 6.

First and second control valves 57 and 58 are controlled by first and second valve opening signals 60 and 61 from a controller 50₁ shown in FIG. 7, respectively, and distribute the steam sent from first high pressure superheater 16 to the main stream side steam and the de-superheating steam.

Controller 50₁ detects the high pressure steam temperature at the outlet of heat recovery steam generator 4, and controls the valve openings of first and second control valves 57 and 58 so that it does not exceed a prescribed temperature.

The steam passed through bypass side steam piping 36 acts as a de-superheating medium, is mixed with main stream side steam passed through second high pressure superheater 15 in steam merging portion 37 provided at the outlet of second high pressure superheater 15, and lowers the steam temperature at the outlet of second high pressure superheater 15. The steam after merged becomes in the even and uniform state and is supplied to third high pressure superheater 13.

FIG. 7 is a diagram showing one example of controller $50_1$ shown in FIG. 6 in this embodiment.

In FIG. 7, component parts common to those shown in FIG. 4 are assigned with the same reference numerals, and the detailed explanation is omitted. The construction, signals, etc. of first valve opening signal preparing means 51, second valve opening signal preparing means 52, higher value preference unit 53 and valve opening signals 54 and 55 are the same as those shown in FIG. 4. Only different point is that a function generator 59 is further provided at the later stage of higher value preference circuit 53, second control valve 58 provided in bypass side steam piping 36 is controlled by an output 61 (second valve opening signal) of higher value preference unit 53 and first control valve 57 provided in main stream side steam piping 35 is controlled by an output 60 (first valve opening signal) of function generator 59. The content of function generator 59 should be preset so that the flow of the steams is not blocked.

Figure 8:
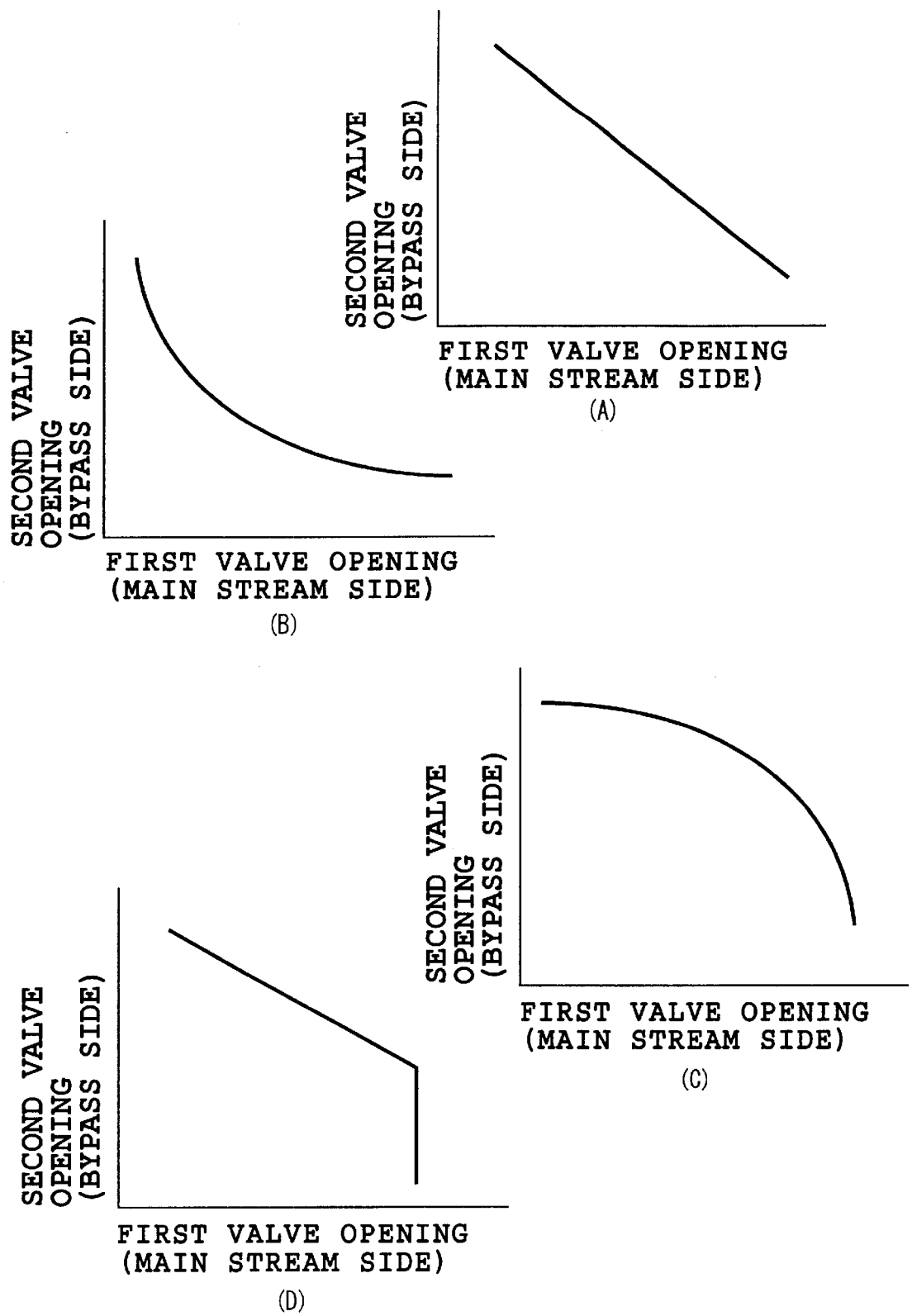
FIGS. 8(A, B, C, & D) are characteristic diagrams of control valves used in the third embodiment of the present invention shown in FIG. 6.

FIG. 8 is a characteristic diagram for explaining the block preventing function of first and control valves 57 and 58 and shows some of qualitative relations between these first and second control valves 57 and 58. The characteristics shown in FIGS. 8 (a)~(d) differ each other, but if one of the control valves 57 and 58 is in the closing direction, the other control valve moves in the direction to open and both first and second control valves 57 and 58 do not move in the closing direction at the same time. This block preventing function can be achieved mechanically or through a software.

In this embodiment adopting a pair of first and second control valves 57 and 58 instead of three way valve 34, if both of first and second control valves 57 and 58 are kept in this relation (if one of first and second control valves 57 and 58 is in the direction to close, the other control valves moves in the direction to open), both first and second control valves 57 and 58 will never be blocked.

According to this embodiment, as first control valve 57 is arranged at the inlet side of second high pressure superheater 15 which is relatively at a low temperature, cheap materials are usable for first control valve 57. Further, as the change in the steam temperature at the inlet side of second high pressure superheater 15 is small throughout the whole operating range of the combined cycle power plant, the reliability of first control valve 57 can be expected. In-addition, the inlet and outlet temperatures of first and second control valves 57 and 58 are equal each other, no thermal stress is generated on first and second control valves 57 and 58 themselves. Further, steam merging portion 37 is the same as that shown in FIG. 3, it becomes possible to uniformly mix the steams. Therefore, when two steam flows in different temperatures are mixed, the thermal stress is not produced, or even if produced, it can be suppressed to a small value.

Figure 9:
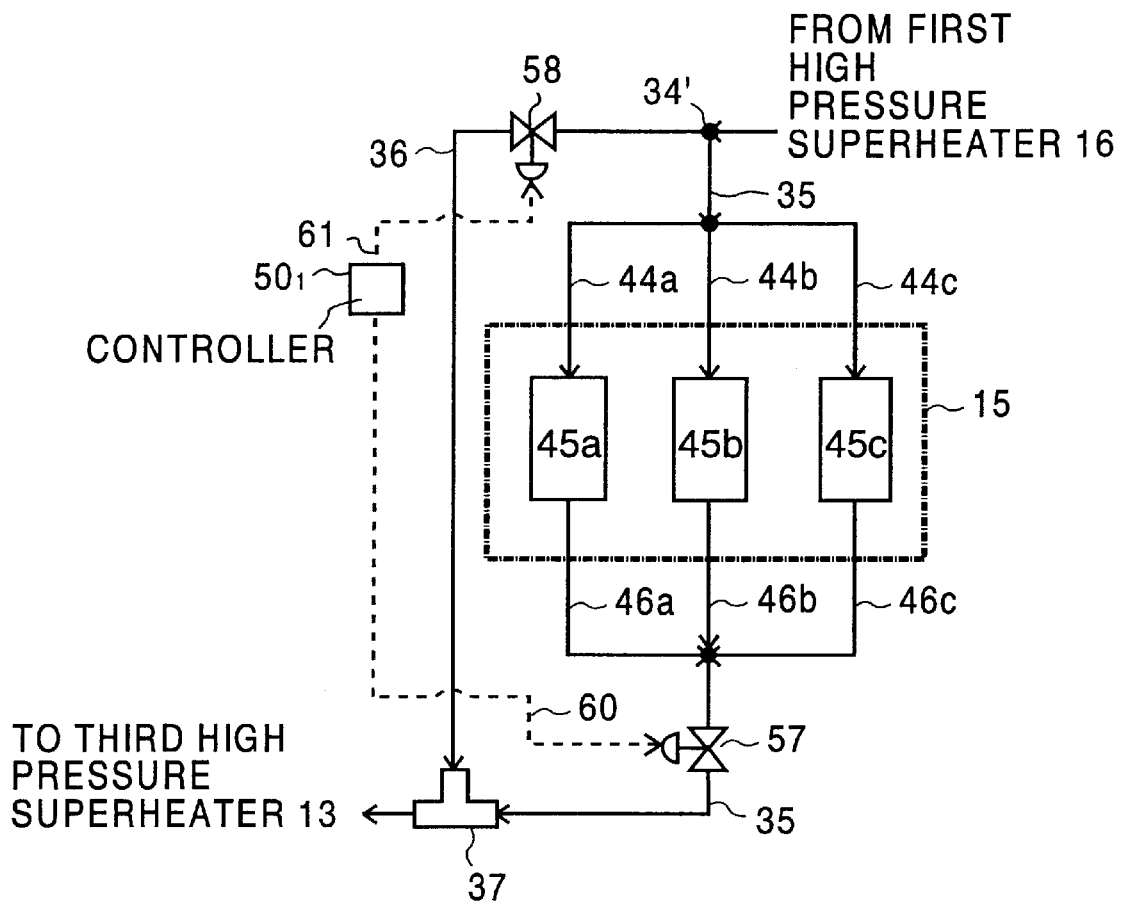
FIG. 9 is a diagram showing the main part of a combined cycle power plant according to a fourth embodiment of the present invention.

Next, a fourth embodiment of this invention will be described referring to FIG. 9. FIG. 9 is a diagram showing the main part of a combined cycle power plant according to a fourth embodiment of this invention, and component parts common to those shown in FIG. 6 are assigned with the same reference numerals and the detailed explanation is omitted.

FIG. 9 differs from FIG. 6 in that first control valve 57 is installed at the downstream side of heating panels 44a, 44b, 44c in second high pressure superheater 15, and all others are the same.

In this embodiment, first control valve 57 is arranged at the outlet side of second high pressure superheater 15 that is at the higher temperature side. Therefore, the specific volume of the steam flowing through first control valve 57 becomes small, and the capacity of first control valve 57 can be made small. Further, other effects are omitted because they are equal to those shown in FIG. 6.

Next, fifth through ninth embodiments of this invention will be described referring to FIG. 10 through FIG. 14, respectively. FIG. 10 through FIG. 14 are diagrams showing the main parts of combined cycle power plants according to fifth through ninth embodiments of the present invention, respectively. These embodiments feature that a steam branching portion, a bypass side steam piping and a steam merging portion are respectively installed for one of heating panels 45a, 45b, 45c of second high pressure superheater 15.

Figure 10:
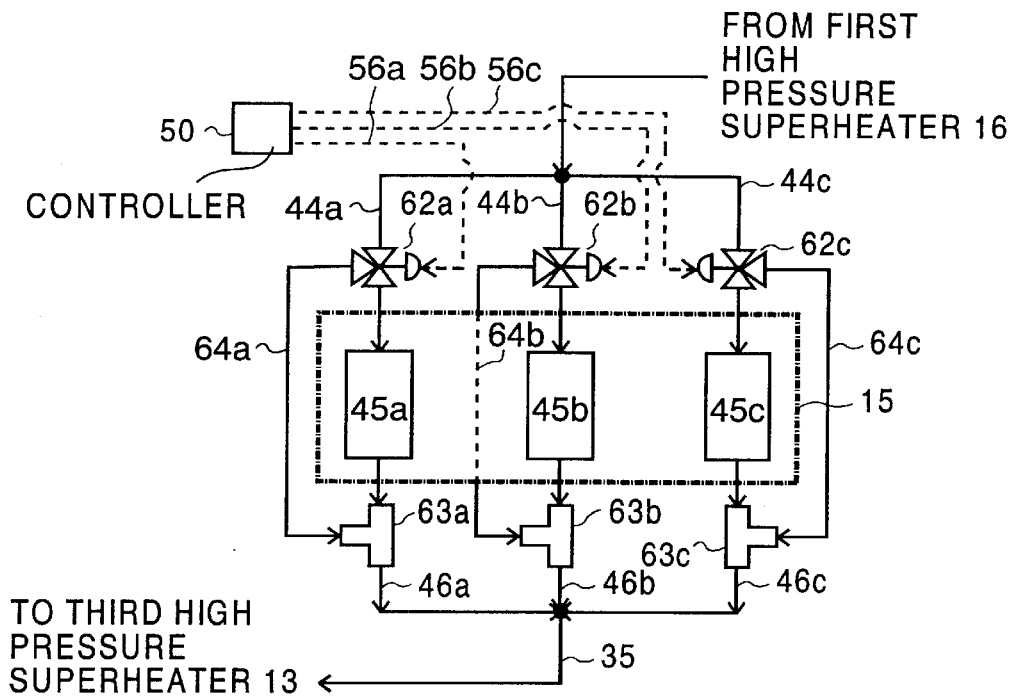
FIG. 10 is a diagram showing the main part of a combined cycle power plant according to a fifth embodiment of the present invention.

In the fifth embodiment shown in FIG. 10, the outlet piping of first high pressure superheater 16 is connected directly to three inlet connecting pipings 44a, 44b, 44c of second high pressure superheater 15. Three way valves 62a, 62b, 62c that respectively function as steam branching portions are installed in inlet connecting pipings 44a, 44b, 44c of second high pressure superheater 15, respectively. While steam merging portions 63a, 63b, 63c are installed at outlet connecting pipings 46a, 46b, 46c of second high pressure superheater 15, respectively. Here, each of steam merging portions 63a, 63b, 63c is composed the same as steam merging portion 37 shown in FIG. 3. Bypass side steam pipings 64a, 64b, 64c are respectively provided between three way valves 62a, 62b, 62c and steam merging portions 63a, 63b, 63c.

Controller 50 inputs the detected temperature of the high pressure steam at the outlet of heat recovery steam generator 4 and so on, and controls the valve openings of three way valves 62a, 62b, 62c so that it does not exceed a prescribed temperature.

The steams passed through bypass side steam pipings 64a, 64b, 64c act as the de-superheating media, are mixed with the steams passed through heating panels 45a, 45b, 45c of second high pressure superheater 15, become in the uniformly mixed state at steam merging portions 63a, 63b, 63c provided in outlet connecting pipings 46a, 46b, 46c of second high pressure superheater 15, respectively, and lower the temperature of the steam at the outlet of second high pressure superheater 15. After merged in steam merging portions 63a, 63b, 63c, the merged steams are further merged and flow into third high pressure superheater 13.

Further, there are 3 valve opening signals 56a, 56b, 56c outputted from controller 50. As valve opening signals 56a, 56b, 56c are the same as three way valve opening signal 56 outputted from controller 50, the explanation thereof is omitted.

According to this embodiment, as three way valves 62a, 62b, 62c and bypass side steam pipings 64a, 64b, 64c are respectively provided for one of heating panels 45a, 45b, 45c of second high pressure superheater 15, it is possible to reduce the capacities of three way valves 62a, 62b, 62c and steam merging portions 63a, 63b, 63c. Further, if three way valves 62a, 62b, 62c become defective for some reason, an effect due to their defection can be dispersed and a trouble of a combined cycle power plant can be prevented. Further, other effects are omitted because they are equal to those shown in FIG. 2.

Figure 11:
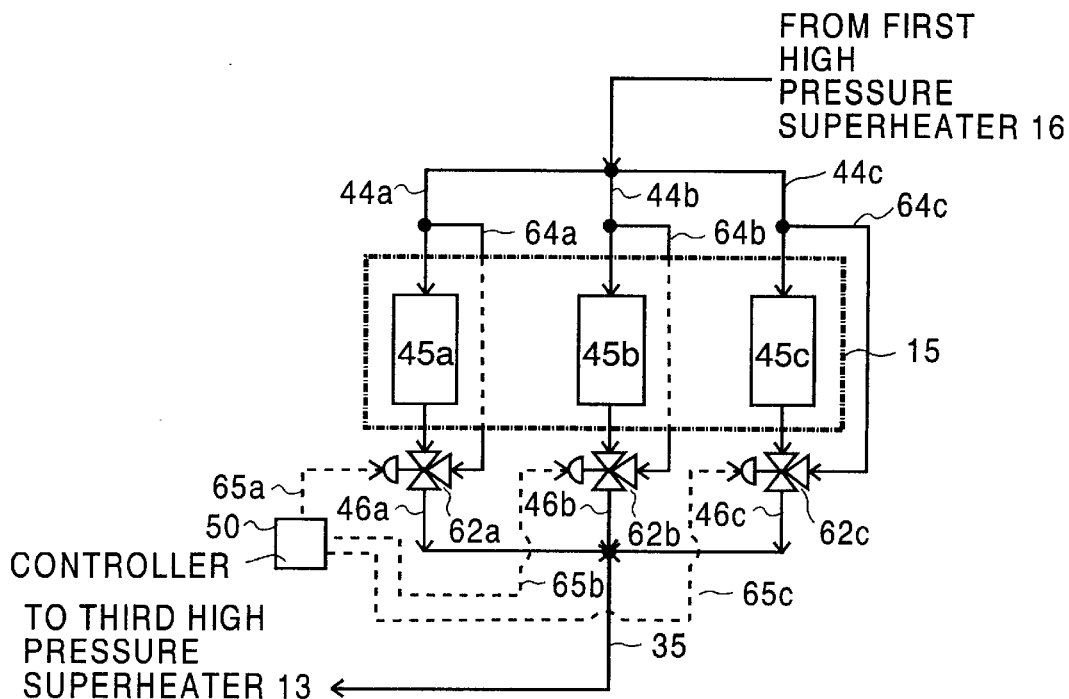
FIG. 11 is a diagram showing the main part of a combined cycle power plant according to a sixth embodiment of the present invention.

FIG. 11 is a diagram showing the sixth embodiment, which differs from the fifth embodiment shown in FIG. 10 in that instead of providing three way valves 62a, 62b, 62c to steam branching portions, pipings are simply branched into the main stream side steam pipings and the bypass side steam pipings and three way valves 62a, 62b, 62c are provided as steam merging portions, respectively.

The actions and effects of this embodiment are those of the fifth and second embodiments shown in FIG. 10 and FIG. 5 combined, and therefore the explanation thereof is omitted.

Figure 12:
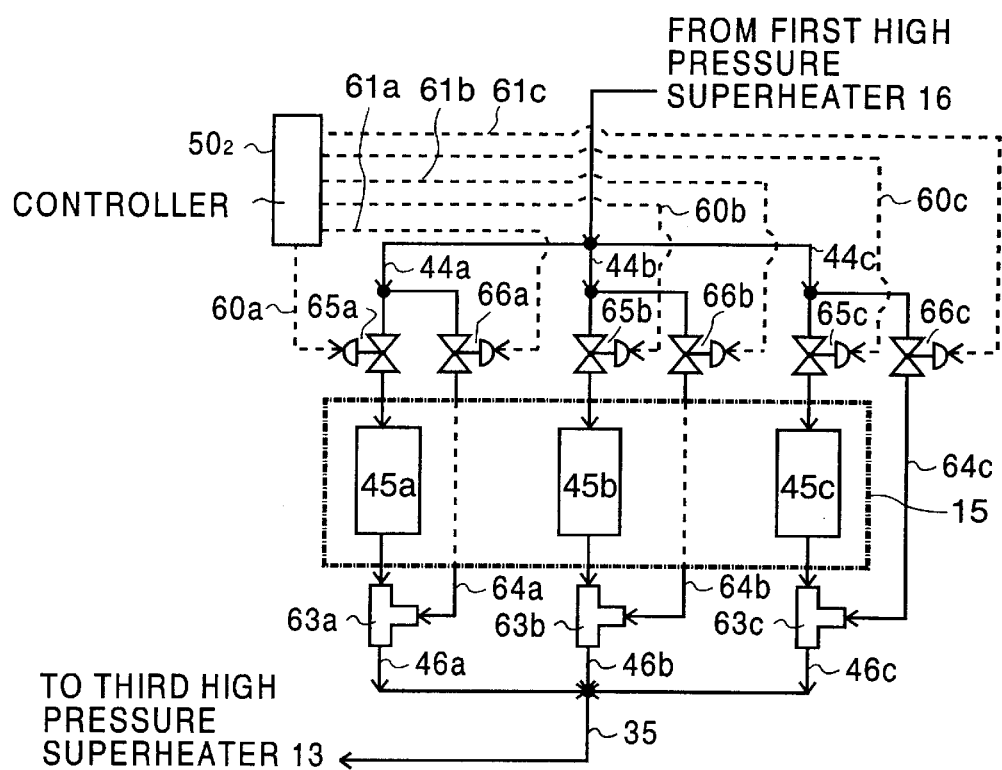
FIG. 12 is a diagram showing the main part of a combined cycle power plant according to a seventh embodiment of the present invention.

FIG. 12 is a diagram showing the seventh embodiment, which differs from the embodiment shown in FIG. 10 in that a pair of first control valve 65a and second control valve 66a are provided instead of three way valve 62a, and similarly, a pair of first and second control valves 65b, 66b and a pair of first and second control valves 65c, 66c are provided instead of three way valves 62b and 62c, respectively. $50_2$ is a controller which outputs first valve opening signals 60a, 60b, 60c to first control valves 65a, 65b, 65c and second valve opening signals 61a, 61b, 61c to second control valves 66a, 66b, 66c, respectively. All others are the same as the embodiments mentioned above and therefore, the explanation is omitted.

Figure 13:
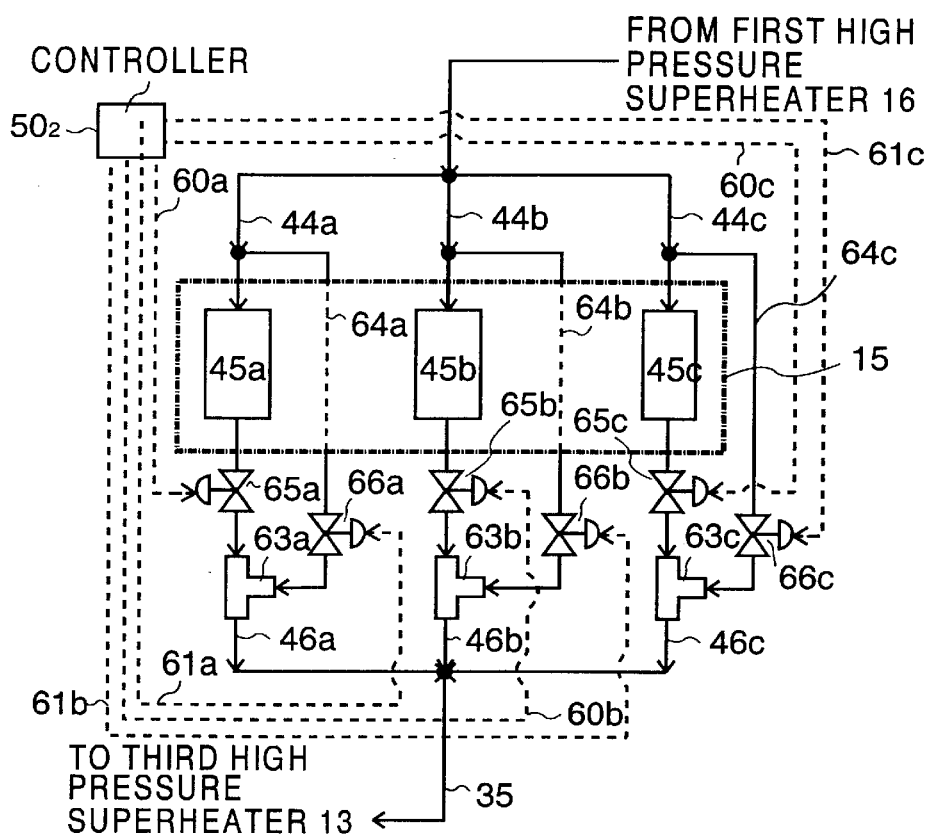
FIG. 13 is a diagram showing the main part of a combined cycle power plant according to an eighth embodiment of the present invention.

FIG. 13 is a diagram showing the eighth embodiment, which differs from the embodiment shown in FIG. 12 only in that first control valves 65a, 65b, 65c and second control valves 66a, 66b, 66c are provided at the downstream side of heating panels 45a, 45b, 45c, respectively. All others are the same as the seventh embodiment shown in FIG. 12, and therefore, the explanation is omitted.

Figure 14:
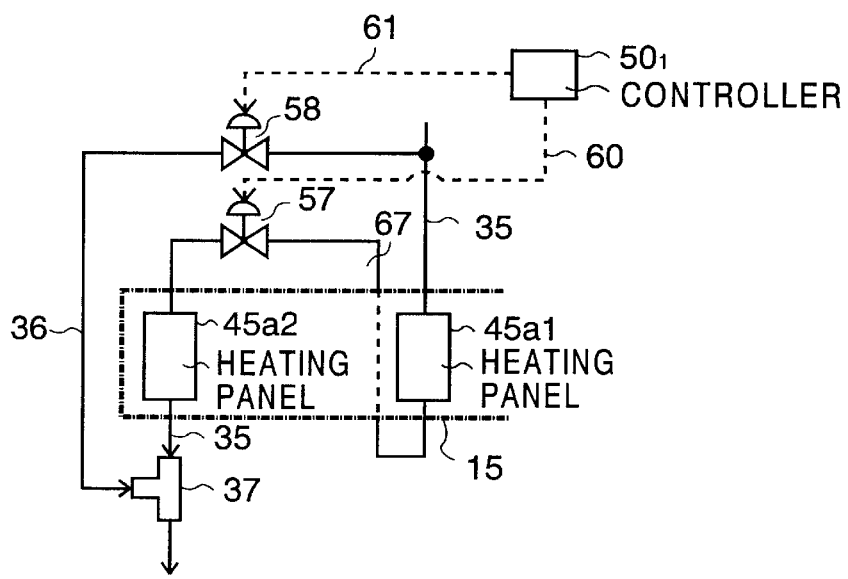
FIG. 14 is a diagram showing the main part of a combined cycle power plant according to a ninth embodiment of the present invention.

FIG. 14 is a diagram showing the main part of the combined cycle power plant according to the ninth embodiment of the present invention. In this embodiment, heating panel 45a is divided into heating panels 45a1 and 45a2 in the flowing direction of superheated steam. They are connected with an intermediate connecting piping 67 at the outside of casing 12, and first control valve 57 is provided to intermediate connecting piping 67 and second control valve 58 is provided to bypass side steam piping 36. Controller $50_1$ outputs first valve opening signal 60 to first control valve 57 and second valve opening signal 61 to second control valve 58. As for heating panels 45b and 45c, they are constructed the same as heating panel 45a, and therefore, the explanation thereof is omitted. All others are the same as the embodiments shown in FIG. 12, and therefore, the explanation is omitted.

In the above-described embodiment, second high pressure superheater is composed of six heating panels 45a1, 45a2, 45b1, 45b2, 45c1 and 45c2, and there are provided three first and second control valves 55, 58 and three intermediate connecting pipings 67. But this invention is not limited to this embodiment. This invention is also applied to a case wherein second high pressure superheater is composed of only two heating panels 45a1, 45a2 and there are provided one first and second control valves 55, 58 and one intermediate connecting piping 67 as shown in FIG. 14.

As described above, according to the present invention, in a combined cycle power plant using steam as a de-superheating medium of a heat recovery steam generator, it becomes possible to prevent a heat recovery steam generator and a gas turbine from being broken or to prevent the piping from being damaged.

Obviously, numerous modifications and variations of the present invention are possible in light of the above teachings. It is therefore to be understood that within the scope of the appended claims, the invention may be practiced otherwise than as specifically described herein.

What is claimed is:

1. A combined cycle power plant, comprising:
    a gas turbine plant including a gas turbine provided with a high temperature cooled portion;
    a heat recovery steam generator to generate steam by recovering thermal energy of exhaust gas from said gas turbine plant;
    a steam turbine plant driven by said steam generated from said heat recovery steam generator; and
    a cooling steam system to flow said steam from said heat recovery steam generator to said high temperature cooled portion of said gas turbine for cooling;
    said heat recovery steam generator including,
    a main stream side steam piping,
    a bypass side steam piping,
    a steam branching portion connected to said main stream side steam piping and said bypass side steam piping to branch steam flowing from a former stage in said heat recovery steam generator into two steams, one as main stream side steam flowing through said main stream side steam piping and another as de-superheating steam flowing through said bypass side steam piping,
    a high pressure superheater connected to said main stream side steam piping for superheating said main stream side steam, and
    a steam merging portion to merge said main stream side steam superheated by said high pressure superheater and said de-superheating steam passed through said bypass side steam piping,
    steam merged in said steam merging portion being supplied to a next stage in said heat recovery steam generator; and
    said heat recovery steam generator being provided with, at one of said steam branching portion and said steam merging portion, means to prevent closing of said main stream side steam piping and said bypass side steam piping.

2. The combined cycle power plant according to claim 1, wherein said heat recovery steam generator is provided with means for protecting against thermal stress generation.

3. The combined cycle power plant according to claim 2, wherein:
    said steam branching portion includes a three way valve provided with an inlet piping, a first outlet piping and a second outlet piping;
    said inlet piping takes in said steam from said former stage in said heat recovery steam generator;
    said first outlet piping is connected to said main stream side piping for flowing said main stream side steam; and
    said second outlet piping is connected to said bypass side steam piping for flowing said de-superheating steam;
    thereby said three way valve is provided with said means to prevent closing of said main stream side steam piping and said bypass side steam piping.

4. The combined cycle power plant according to claim 1, wherein:
    said heat recovery steam generator further includes,
    a first control valve provided to said main stream side steam piping for controlling a flow of said main stream side steam, and
    a second control valve provided to said bypass side steam piping for controlling a flow of said de-superheating steam,
    thereby said first and second control valves are provided with said means to prevent closing of said main stream side steam piping and said bypass side steam piping.

5. The combined cycle power plant according to claim 1, wherein said steam merging portion includes a three way valve provided with a first inlet piping, a second inlet piping and an outlet piping, said first inlet piping being connected to said main stream side piping at an outlet of said high pressure superheater for taking in said main stream side steam, said second inlet piping being connected to said bypass side steam piping for taking in said de-superheating steam, said three way valve merging said main stream side steam superheated by said high pressure superheater and said de-superheating steam passed through said bypass side steam piping, and said steam merged in said three way valve being supplied from said outlet piping to said next stage in said heat recovery steam generator.

6. The combined cycle power plant according to claim 1, wherein:
said steam merging portion includes an inlet piping, an outlet piping and a coupling;
said inlet piping is connected to said main stream side steam piping at an outlet of said high pressure superheater for taking in said main stream side steam;
said coupling includes an inner piping and an outer piping; said outer piping is connected to said bypass side steam piping at an inlet thereof to take in said de-superheating steam;
said inner piping is connected to at an inlet thereof said inlet piping to take in said main stream side steam superheated by said high pressure superheater;
said inner piping is surrounded by said outer piping with a prescribed gap and is provided with a plurality of holes through which said de-superheating steam blows in;
in said inner piping said main stream side steam merges with said de-superheating steam blown in through said holes;
said outlet piping is connected to said inner piping at an outlet thereof;
said steam merged in said inner piping is supplied from said outlet piping to said next stage in said heat recovery steam generator; and
thereby said steam merging portion is provided with said means for protecting against thermal stress generation.

7. The combined cycle power plant according to claim 1 or claim 4, wherein:
said high pressure superheater includes a plurality of heating plates arranged in parallel with each other in a flowing direction of said main stream side steam.

8. The combined cycle power plant according to claim 7, wherein:
said heat recovery steam generator includes a plurality of said main stream side steam pipings, said bypass side steam pipings, said steam branching portions and said steam merging portions; and
each of said main stream side steam pipings, said bypass side steam pipings, said steam branching portions and said steam merging portions are provided to one of said heating panels in said high pressure superheater, respectively.

9. The combined cycle power plant according to claim 4, wherein:
said first control valve is provided to said main stream side steam piping at an outlet side of said high pressure superheater.

10. The combined cycle power plant according to claim 1, wherein:
said high pressure superheater includes a plurality of heating plates arranged in parallel with each other in a flowing direction of said main stream side steam;
said heat recovery steam generator further includes, an intermediate connecting piping exposed to an outside of a casing of said heat recovery steam generator for connecting said heating panels in series,
a first control valve provided to said intermediate connecting piping for controlling a flow of said main stream side steam, and
a second control valve provided to said bypass side steam piping for controlling a flow of said de-superheating steam; and
thereby said first and second control valves are provided with said means to prevent closing of said main stream side steam piping and said bypass side steam piping.

11. The combined cycle power plant according to anyone of claims 3 through 5, wherein:
said heat recovery steam generator further includes a controller; and
said controller includes,
a first valve opening signal preparing means that prepares a first valve opening signal based on a deviation between a set-up temperature of a steam at an outlet of said high pressure superheater and a measured temperature of said steam at said outlet of said high pressure superheater,
a second valve opening signal preparing means that prepares a second valve opening signal based on a deviation between a set-up temperature of a cooling steam at an inlet of said gas turbine obtained by a gas turbine load related measured value and a forecast temperature of said cooling steam at said inlet of said gas turbine obtained by said measured temperature of said steam at said outlet of said high pressure superheater, and
a higher value preference circuit that selects a higher value signal out of said first valve opening signal and said second valve opening signal and outputs said higher value signal as a valve opening signal so as to increase an amount of said de-superheating steam.

12. The combined cycle power plant according to claim 11, wherein:
said controller further includes a function generator that inputs said higher value signal selected by said higher value preference circuit;
said function-generator is so set that two flows of said main stream side steam and said de-superheating steam are not blocked;
an output signal of said function generator is applied to said first control valve provided in said main stream side steam piping as a first valve opening signal; and
said higher value signal from said higher value preference circuit is applied to said second control valve provided in said bypass side steam piping as a second valve opening signal.

13. The combined cycle power plant according to one of claims 4, 9 and 10, wherein:
said first and second control valves is kept in a relation such that one of said first and second control valves moves in a direction to close and another one of said first and second control valves moves in a direction to open.

* * * * *